(12) United States Patent
Freitag et al.

(10) Patent No.: US 6,980,404 B2
(45) Date of Patent: Dec. 27, 2005

(54) METHOD AND APPARATUS FOR IMPROVING SOFT MAGNETIC PROPERTIES OF A SPIN VALVE WHILE RETAINING HIGH GIANT MAGNETORESISTANCE

(75) Inventors: James Mac Freitag, San Jose, CA (US); Mustafa Pinarbasi, Morgan Hill, CA (US)

(73) Assignee: Hitachi Global Storage Technologies Netherlands B.V. (NL)

(*) Notice: Subject to any disclaimer, the term of this patent is extended or adjusted under 35 U.S.C. 154(b) by 68 days.

(21) Appl. No.: 10/289,105

(22) Filed: Nov. 6, 2002

(65) Prior Publication Data

US 2004/0085689 A1 May 6, 2004

(51) Int. Cl.$^7$ .................................................. G11B 5/39
(52) U.S. Cl. ................................................. 360/324.12
(58) Field of Search ......................... 360/324.1, 324.11, 360/324.12, 324.2

(56) References Cited

U.S. PATENT DOCUMENTS

| | | | |
|---|---|---|---|
| 5,582,927 A | 12/1996 | Andricacos et al. | |
| 5,640,754 A | 6/1997 | Lazzari et al. | |
| 5,764,448 A | 6/1998 | Lazzari et al. | |
| 5,840,420 A | 11/1998 | Parker et al. | |
| 5,883,765 A | 3/1999 | Gaud et al. | |
| 6,167,611 B1 | 1/2001 | Gaud et al. | |
| 6,195,240 B1 | 2/2001 | Gill | |
| 6,315,839 B1 | 11/2001 | Pinarbasi et al. | |
| 6,393,692 B1 * | 5/2002 | Ju et al. | 29/603.14 |
| 6,524,491 B1 * | 2/2003 | Liu et al. | 216/22 |
| 2001/0021089 A1 * | 9/2001 | Miyauchi et al. | 360/324.2 |

FOREIGN PATENT DOCUMENTS

JP  6-268280  *  9/1994

OTHER PUBLICATIONS

"Laminated Seed Layers for Plated Thin Film Heads and Structures," IBM Technical Disclosure Bulletin, vol. 35, No. 1B, Jun. 1992, pp. 457–459.

* cited by examiner

Primary Examiner—David L. Ometz
(74) Attorney, Agent, or Firm—Crawford Maunu PLLC

(57) ABSTRACT

A giant magnetoresistance (GMR) head for magnetic storage systems, the GMR head having a free layer with improved soft magnetic properties while retaining giant magnetoresistance (GMR) effects. The free layer comprises an alloy comprising $Co_x$, $Fe_y$, and $Cu_z$, wherein x, y, and z represent the atomic weight percentage of Co, Fe, and Cu, respectively.

16 Claims, 6 Drawing Sheets

| Free Layer | Rsheet Ω/sq | ΔR/R % | He Oe | Hce Oe | Hch Oe | Hk Oe | Thickness Å | lambda |
|---|---|---|---|---|---|---|---|---|
| CoFeCu 40 Å | 26.4 | 8.81 | -6.4 | 5.0 | 0.63 | 4.0 | 41.8 | -1.97E-06 |
| CoFe 40 Å | 26.2 | 8.74 | -11.1 | 6.2 | 0.80 | 5.5 | 37.9 | -1.40E-06 |
| Standard 40 Å | 23.9 | 9.18 | -8.1 | 3.1 | 0.56 | 3.5 | 41.4 | -7.47E-07 |

Fig. 7

METHOD AND APPARATUS FOR IMPROVING SOFT MAGNETIC PROPERTIES OF A SPIN VALVE WHILE RETAINING HIGH GIANT MAGNETORESISTANCE

BACKGROUND OF THE INVENTION

1. Field of the Invention

This invention relates in general to giant magnetoresistance (GMR) heads for magnetic storage systems, and more particularly to a method and apparatus for improving soft magnetic properties of a spin valve free layer while retaining giant magnetoresistance (GMR) effects.

2. Description of Related Art

Magnetic recording systems that utilize magnetic disk and tape drives constitute the main form of data storage and retrieval in present-day computer and data processing systems. In the recording process, information is written and stored as magnetization patterns on the magnetic recording medium. Scanning a write head over the medium and energizing the write head with appropriate current waveforms accomplish this recording process. In a read-back process, scanning a magnetoresistive (MR) sensor over the medium retrieves the stored information. This MR read head sensor intercepts magnetic flux from the magnetization patterns on the recording medium and converts the magnetic flux into electrical signals, which are then detected and decoded.

However, limitations of MR sensor performance were drastically expanded by the discovery of the giant magnetoresistance (GMR) effect, also known as the spin-valve effect. In contrast to a conventional MR effect, which is based on homogeneous ferromagnetic metals or alloys, the GMR effect is present only in heterogeneous magnetic systems with two or more ferromagnetic components and at least one nonmagnetic component. Hence, a GMR head has a greater sensitivity to magnetic fields from a disk.

Accordingly, a spin valve sensor is employed by a GMR read head for sensing magnetic fields on a moving magnetic medium, such as a rotating magnetic disk. A typical spin valve sensor includes a nonmagnetic electrically conductive spacer layer between a ferromagnetic pinned layer structure and a ferromagnetic free layer structure. An antiferromagnetic pinning layer interfaces and is exchange coupled to the pinned layer structure for pinning a magnetic moment of the pinned layer structure 90° to an air bearing surface (ABS) where the ABS is an exposed surface of the sensor that faces the rotating disk. Leads are connected to the spin valve sensor for conducting a sense current.

A magnetic moment of the free layer structure is typically oriented parallel to the ABS in a quiescent condition, the quiescent condition being where the sense current is conducted through the sensor in the absence of any signal fields. The magnetic moment of the free layer structure is free to rotate from the parallel position in response to signal fields from the rotating magnetic disk. Changes in response to field signals from the rotating disk changes the resistance of the spin valve sensor due to the angle between the magnetic moments of the pinned and free layer structures. The sensitivity of the sensor is quantified by a magnetoresistive coefficient dr/R ($\Delta R/R$) where dr is the change in resistance of the sensor between parallel and antiparallel orientations of the pinned and free layer structures and R is the resistance of the sensor when the moments are parallel. The GMR effect operates to produce a lower resistance for parallel alignment of the pinned and free layer structures, and a higher resistance for antiparallel alignment of the pinned and free layer structures.

Several classes of soft magnetic materials have evolved for use in the construction of spin valves. Permalloy, a general term that refers to alloys of Ni and Fe, is one class used in the fabrication of spin valves due to permalloy's very small anisotropy (i.e., varying of magnetic properties along different axis) and magnetostriction characteristics. Another important design feature for spin valves is to provide a magnetic material for the free layer structure that lowers coercivity, i.e., the magnetic field necessary to switch the direction of magnetization and decrease magnetic induction to zero.

Moreover, the success of hard disk drives (HDDs) originates from these successful design features and an ever-increasing demand for storage capacity coupled with a consistent reduction in price per megabyte. Areal density (expressed as billions of bits per square inch of disk surface area, Gbits/in$^2$) is the product of linear density (bits of information per inch of track) multiplied by track density (tracks per inch), and varies with disk radius. Improved areal density levels have been the dominant reason for the reduction in price per megabyte. High areal densities have been achieved by introducing new technology and by proportionally reducing certain key dimensions, such as the GMR head, within the HDD ("scaling"). Thus, there is a present need to reduce the free layer thickness in GMR spin valve sensor.

Current spin valve designs have free layers composed of a bilayer of CoFe and NiFe. A minimum thickness of CoFe in contact with a Cu spacer layer in the spin valve is necessary to achieve the highest GMR signal. In other words, sensitivity is increased with a reduction in the thickness of the free layer. However, to maintain acceptable sensor performance, and GMR, the bilayer material CoFe should not be reduced far below 15 Å. Hence, in reducing the bilayer structure of CoFe and NiFe to a thickness below 15 Å, the NiFe must be reduced to near zero.

The soft magnetic properties of CoFe are less attractive than NiFe and as the total thickness of the free layer is reduced, the ratio of CoFe to NiFe increases. As a result of the increased ratio, coercivity increases causing a strong resistance to change in magnetization of the bilayer structure. Thus, it is important to find a replacement for CoFe with improved soft magnetic properties, yet while retaining high GMR.

It can be seen that there is a need for providing a high quality soft magnetic material for the spin valve free layers of magnetic recording heads.

More particularly, it can be seen that there is a need for providing improved soft magnetic properties for free layers of spin valves while retaining giant magnetoresistance (GMR) effects.

SUMMARY OF THE INVENTION

To overcome the limitations in the prior art described above, and to overcome other limitations that will become apparent upon reading and understanding the present specification, the present invention discloses a method and apparatus for improving soft magnetic properties of the spin valve free layer while retaining giant magnetoresistance (GMR) effects.

The present invention solves the above-described problems by providing a high quality magnetic material, such as CoFeCu, as a replacement for the CoFe/NiFe bilayer spin valve structure. The CoFeCu free layer provides enhanced sensitivity by an improved magnetoresistive coefficient (dr/R) and increased sheet resistance coupled with a low uniaxial anisotropy field (Hk). The design of the present invention yields a high amplitude sensor with a desired magnetic stability.

A method for forming a spin valve sensor in accordance with the principles of the present invention includes forming a pinned layer, forming a spacer layer; and forming a free layer disposed on the spacer layer, the free layer comprising $Co_x$, $Fe_y$, and $Cu_z$, wherein x, y, and z represent the atomic weight percentages of Co, Fe, and Cu, respectively.

A thin film magnetoresistive (MR) spin valve read sensor in accordance with the principles of the present invention includes a pinned layer, a spacer layer disposed on the pinned layer and a free layer being disposed upon the spacer layer, the free layer comprising $Co_x$, $Fe_y$, and $Cu_z$, wherein x, y, and z represent the atomic weight percentages of Co, Fe, and Cu, respectively.

A magnetic storage system in accordance with the principles of the present invention includes at least one movable magnetic medium, a slider, an actuator for positioning the slider relative to the movable magnetic medium and a head coupled to the slider such that the head may be positioned relative to the at least one movable magnetic medium by the action of moving the slider with the actuator; wherein the head includes a GMR sensor having a pinned layer, a spacer layer disposed on the pinned layer and a free layer being disposed upon the spacer layer, the free layer comprising $Co_x$, $Fe_y$, and $Cu_z$, wherein x, y, and z represent the atomic weight percentages of Co, Fe, and Cu, respectively.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 7 is a table comparing the properties of a free layer formed by a CoFeCu alloy with other free layer compositions according to the present invention.

DETAILED DESCRIPTION OF THE INVENTION

In the following description of the exemplary embodiment, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

The present invention solves the above-described problems by forming a GMR sensor including a spin valve free layer formed of CoFeCu or a CoFeCu alloy. The free layer according to the present invention has soft magnetic properties that reduce at least the magnetic field needed to switch the direction of magnetization in a spin valve structure (i.e., coercivity).

Figure 1:
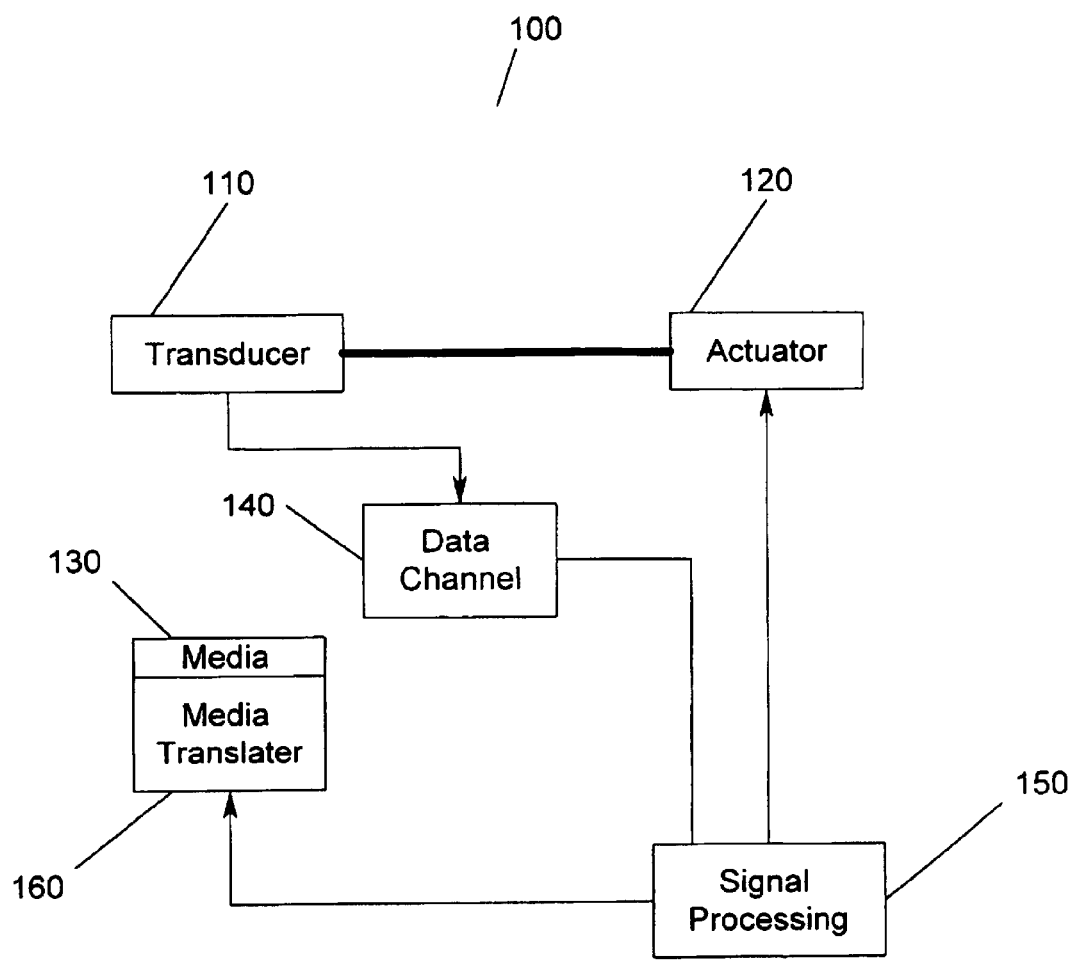
FIG. 1 illustrates a storage system according to the present invention.

FIG. 1 illustrates a storage system 100. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor 150 controls the actuator 120 and processes the signals of the data channel 140. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
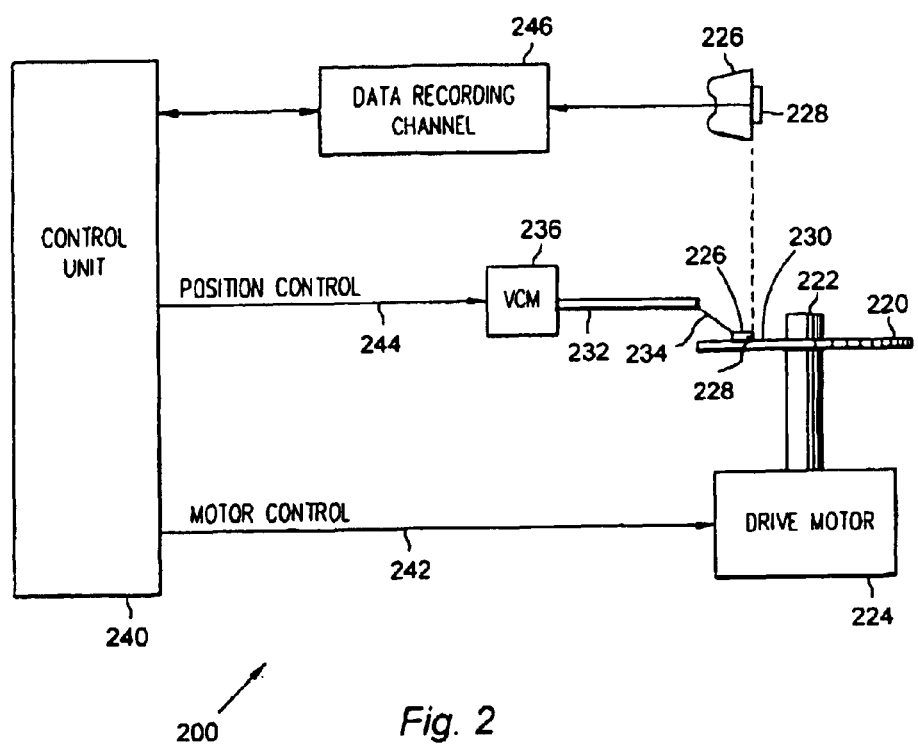
FIG. 2 illustrates one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228 where the heads 228 incorporate a giant magnetoresistive (GMR) sensor of the present invention. As the disk(s) 220 rotate, slider 226 is moved radially in and out over disk surface 230 so that heads 228 may access different portions of the disk 220 where desired data is recorded. Each slider 226 is attached to an actuator arm 232 by means of a suspension 234. The suspension 234 provides a slight spring force, which biases slider 226 against the disk surface 230. Each actuator arm 232 is attached to an actuator 236. The actuator 236 may be a voice coil motor (VCM). The VCM has a coil movable within a fixed magnetic field, the direction and speed of the coil movements being controlled by motor current signals supplied by a control unit 240.

During operation of the disk drive 200, the rotation of the disk 220 generates an air bearing between slider 226 and the disk surface 230, which exerts an upward force or lift on the slider 226. The surface of the slider 226, which includes head 228 and faces the surface of disk 220 is referred to as an air-bearing surface (ABS). The air bearing thus counterbalances the slight spring force of suspension 234 and, during normal operation, supports the slider 226 off of, and slightly above, the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as drive motor control signals on line 242 and head position and seek control signals on line 244. The control signals on line 244 provide the desired current profiles to optimally move and position the slider 226 to the desired data track on the disk 220. Read and write signals are communicated to and from read/write heads 228 through recording channel 246.

Figure 3:
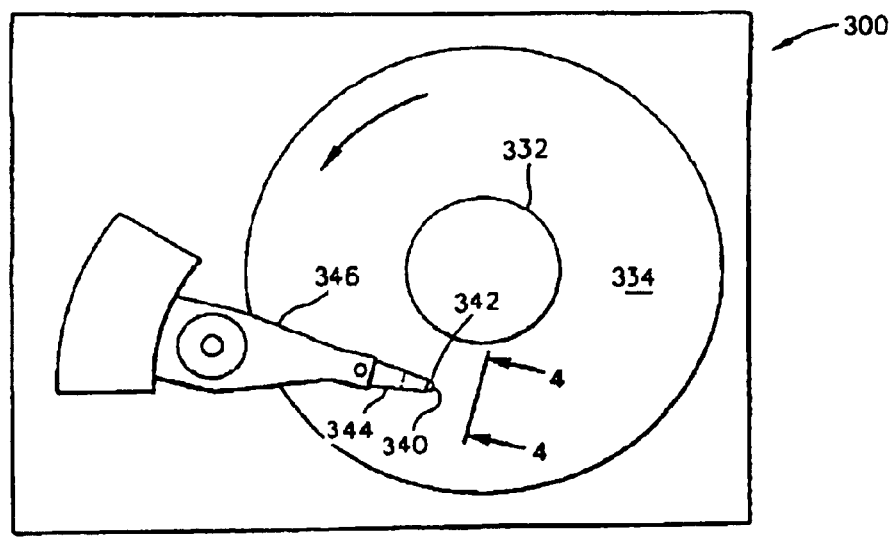
FIG. 3 is a top view of a magnetic disk drive.

The above description of a typical magnetic disk drive storage system 200, and the accompanying illustration of FIG. 3 are for representation purposes only. It should be apparent that disk storage systems may contain a large number of disks and actuators, and that each actuator may support a number of sliders. Many other variations of the basic typical magnetic disk drive storage system 200 may be used in conjunction with the present invention while keeping within the scope and intention of the invention. However, those skilled in the art will recognized that the present invention is not meant to be limited to magnetic disk drive storage systems as illustrated in FIG. 2.

Figure 4:
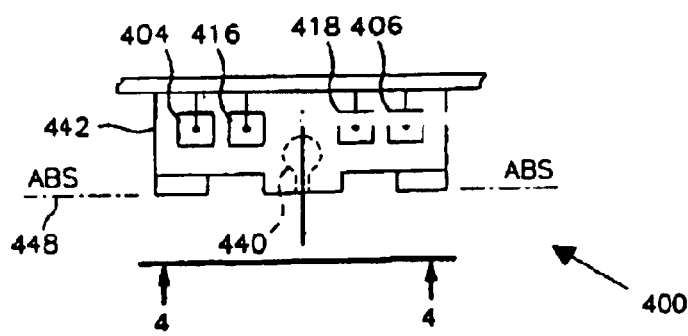
FIG. 4 illustrates one example of a magnetic sensor.

FIG. 3 is a top view 300 of a magnetic disk drive. The magnetic disk drive 300 includes a spindle 332 that supports and rotates a magnetic disk 334. A combined read and write magnetic head 340 is mounted on a slider 342 that is supported by a suspension 344 and actuator arm 346. The present invention is not limited to a single unit, and a plurality of disks, sliders and suspensions may be employed in a large capacity direct access storage device (DASD). The suspension 344 and actuator arm 346 position the slider 342 so that the magnetic head 340 is in a transducing relationship with a surface of the magnetic disk 334. When the disk 334 is rotated by a motor, the slider is supported on a thin cushion of air (air bearing) between the surface of the disk 334 and the air-bearing surface (ABS) (FIG. 4—448). The magnetic head 340 may then be employed for writing information to multiple circular tracks on the surface of the disk 334, as well as for reading information therefrom.

FIG. 4 illustrates one example of a magnetic sensor 400 according to the present invention. As shown in FIG. 4, first and second solder connections 404 and 416 connect leads from the slider 442 to a suspension (FIG. 3—346). Third and fourth solder connections 418 and 406 connect leads from a coil in the magnetic head 440 to the suspension (FIG. 3—346). However, one of ordinary skill in the art will realize that the present invention is not meant to be limited to the magnetic sensor configuration shown in FIG. 4, but that other magnetic sensor configurations may be used in the present invention.

Figure 5:
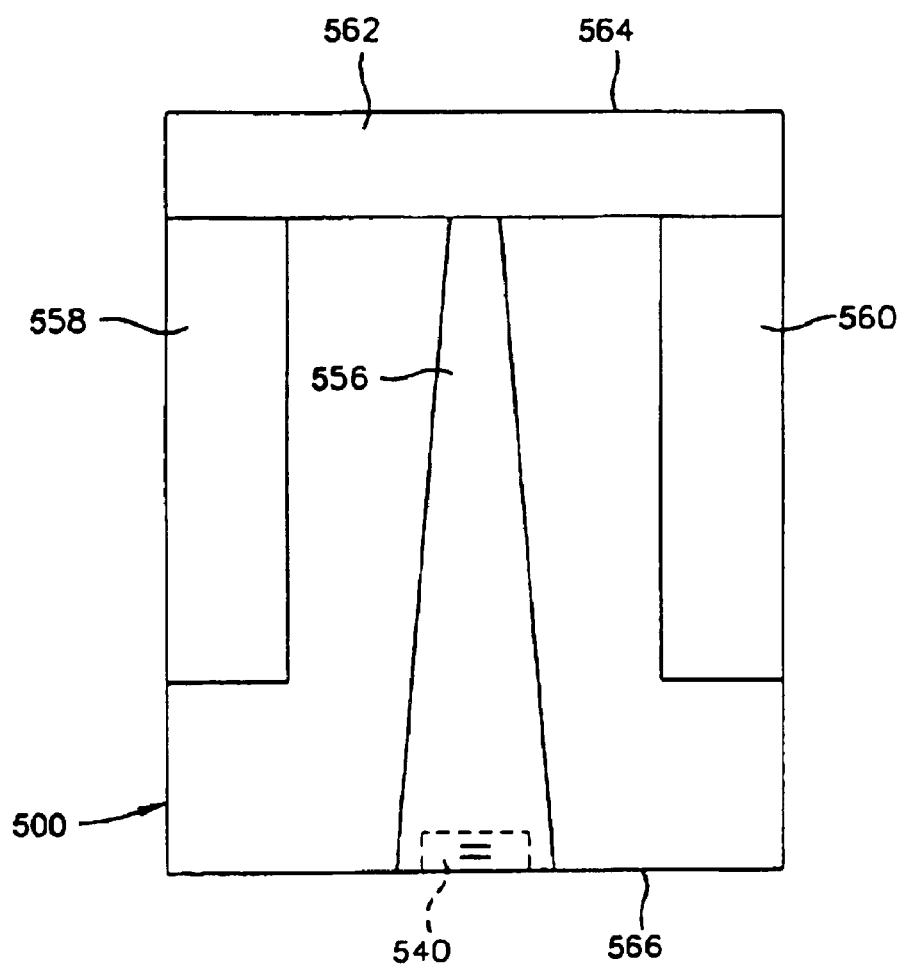
FIG. 5 illustrates an air bearing surface (ABS) of a slider.

FIG. 5 illustrates an air bearing surface (ABS) of a slider 500. The slider 500 has a center rail 556 that supports the magnetic head 540, and side rails 558 and 560. The rails 556, 558 and 560 extend from a cross rail 562. With respect to rotation of the magnetic disk (FIG. 3—334), the cross rail 562 is at a leading edge 564 of the slider and the magnetic head 540 is at a trailing edge 566 of the slider. However, one of ordinary skill in the art will realize that the present invention is not limited to the above ABS configuration.

Figure 6:
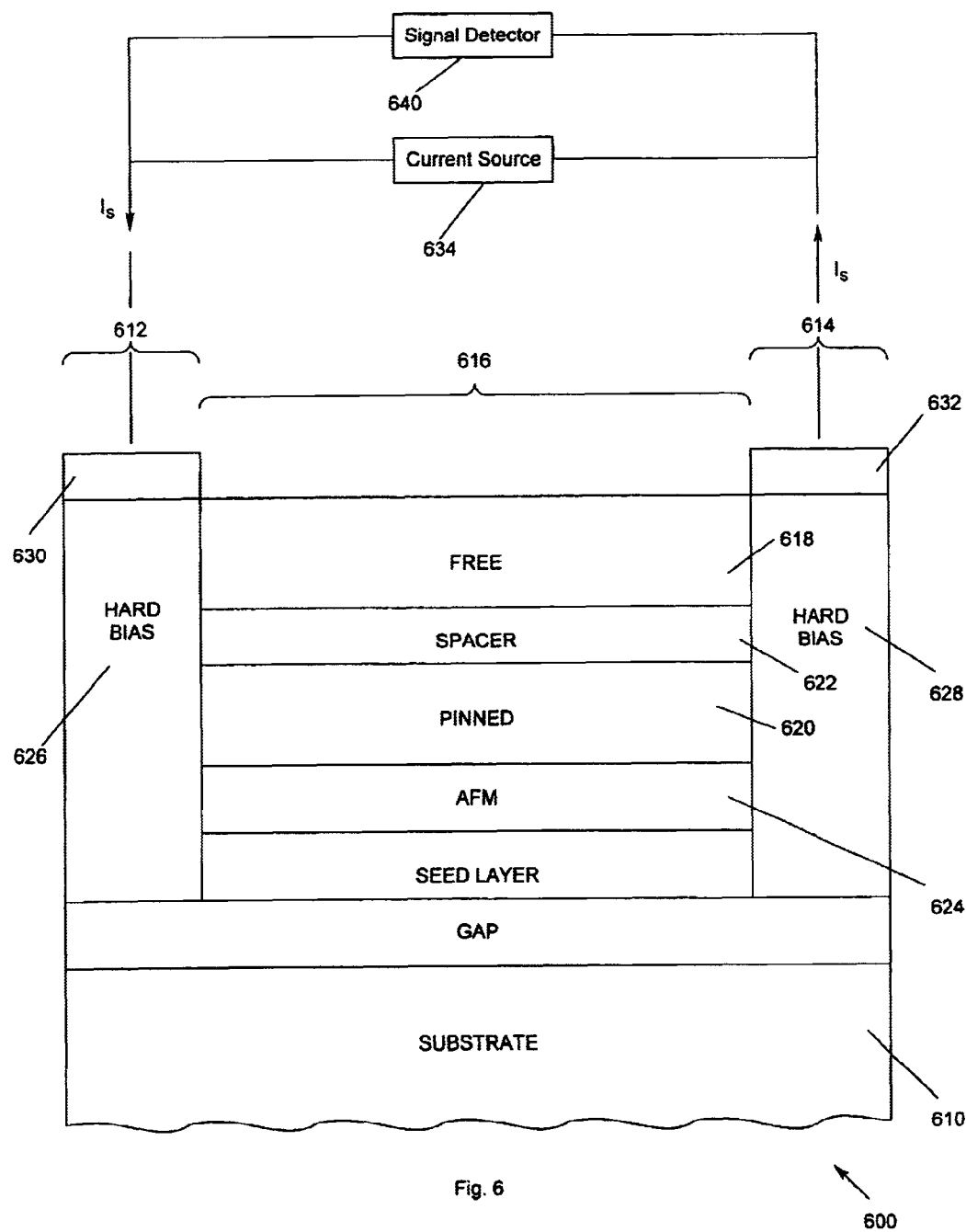
FIG. 6 illustrates an air bearing surface view of a GMR sensor according to the present invention.

FIG. 6 illustrates an air bearing surface view of a GMR sensor 600 according to the present invention. GMR heads are very attractive for use as high density recording magneto resistive (MR) heads because of their high readback output voltages, linear response, and symmetrical read sensitivity profiles.

In FIG. 6, an air bearing surface view of a GMR sensor 600 including end regions 612 and 614 separated by a central region 616 is shown. A free layer (free ferromagnetic layer) 618 is separated from a pinned layer (AP-pinned ferromagnetic layer) 620 by a non-magnetic, electrically-conducting spacer layer 622 (typically, primarily copper). In one embodiment of the present invention, the free layer 618 includes, for example, CoFeCu or a CoFeCu alloy. The magnetization of the pinned layer 620 is fixed through exchange coupling with an antiferromagnetic (AFM) layer 624. The magnetization of the free layer 618, however, is free to rotate in the presence of an external field. Free layer 618, spacer layer 622, pinned layer 620 and the AFM layer 624 are all formed in the central region 616.

Hard bias layers 626 and 628 formed in the end regions 612 and 614, respectively, provide longitudinal bias for the free layer 618. Leads 630 and 632 formed over hard bias layers 626 and 628, respectively, provide electrical connections for the flow of the sensing current $I_s$, from a current source 634 to the GMR sensor 600. A signal detector 640, which is electrically connected to the leads 630 and 632, senses the change in resistance of the GMR sensor 600 due to changes induced by the external magnetic field (e.g., the field generated when a field transition on a disk is moved past the GMR sensor 600). A cap (not shown) is optionally provided on the free layer 618.

During the manufacturing of a read/write head for magnetic recording media, the write head may be formed adjacent to the GMR sensor 600. One skilled in the art will realize that during the manufacture of the write head, and during some of the processes involved in manufacturing the GMR sensor 600, itself, high temperature processes have inevitably been involved. (Examples are the photoresist baking of the write head, the annealing of the AFM layer 624 materials on a substrate 610, which is required for some materials, and resetting of the pinned layer 620). At these temperatures, the grain boundaries of adjacent materials tend to become aligned, notably at the junction of the spacer 622 and the free layer 618 and/or at the boundary of the spacer 622 and the pinned layer 620. In this condition, it is very easy for diffusion between such layers to occur. This results in a degradation of the output signal amplitude produced by the GMR sensor 600.

Other constructions of the GMR sensor 600 are possible, and one skilled in the art could readily adapt the present invention for use with such alternative constructions. For example, where pinned layers 620 having multiple layers are used, multiple iterations of the spacer 622 (and diffusion barrier) could also be employed. It is important to note that in order to illustrate the present invention, the inventive free layer 618 is shown in the context of the GMR sensor 600. However, the invention is by no means limited to such constructions. Indeed, it is intended that the free layer be incorporated, as described herein, into more sophisticated constructions (perhaps containing additional material layers, or the like), both those presently in existence and those to be developed in the future.

FIG. 7 is a table 700 comparing the properties of a free layer formed by a CoFeCu alloy with other free layer compositions according to the present invention. Magnetic properties vary as a function of the composition of an alloy. According to the present invention, a varying of the Cu content in a composition can cause a decrease in the coercivity of the composition. For example, anisotropy values increase with the Cu content of a CoFeCu film 710. Also, for example, anisotropy values higher than 11 Oersteds (Oe) can be achieved in the alloys by Cu enrichment of a CoFeCu film 710. Hence, the anisotropy for a CoFeCu film 710 in the 3 to 6 atomic % Cu range is 13–14 Oe, and increases to about 16 to 20 Oe for films with about 14 to 20 atomic % Cu.

In FIG. 7, a comparison of various magnetic properties of a CoFeCu alloy 710, CoFe 720, and a standard bilayer (CoFe 15 Å/NiFe 25 Å) 730 free layer is examined. The various properties include the sheet resistance of a spin valve (Rsheet) 740, sensitivity ($\Delta R/R$) 750 and the coupling layer between a pinned layer and the free layer (He) 760. Also, the coercivity, or resistance of a magnetic material to magnetization, is shown. The coercivity is displayed for both the easy axis (Hce) 770 (magnetism of a material in a favorable direction), coercivity hard axis (Hch) 780 (magnetism of a material in an unfavorable direction), uniaxial anisotropy (Hk) 790, thickness 792 and lambda (i.e., the magnetostriction constant) 795.

As GMR heads are made smaller, the standard bilayer free layer structure formed from CoFe and NiFe is also reduced. However, to maintain acceptable free layer properties, the CoFe should not be reduced to a thickness below 15 Å. Thus, the NiFe must be reduced to near zero as the bilayer structure reaches 15 Å in thickness. Accordingly, the ratio of CoFe to NiFe in the bilayer structure increases. However, the soft magnetic properties of CoFe are less attractive than NiFe.

Hence, the table of FIG. 7 compares properties for spin valves including a 40 Å free layers of CoFeCu (81/11/8 atomic %) 710, a CoFe (90/10 atomic %) 720 and NiFe bilayer structure with NiFe reduced to zero, and a standard bilayer structure (CoFe 15 Å/NiFe 25 Å) 730. According to the present invention, although the sensitivity (ΔR/R) 750 is slightly reduced for CoFe 720 and CoFeCu 710, the coercivity, Hce 770 and Hch 780, for CoFeCu 710 is much improved over CoFe 720 as seen by these reduced values. This improved coercively (Hce 770, Hch 780) coupled with a low uniaxial anisotropy field, Hk 790, yields a high amplitude sensor (ΔR/R 750), and thus, a desired magnetic softness and stability.

In one embodiment of the present invention, a free layer 797 for $Co_x$, $Fe_y$, and $Cu_z$ may have, for example, the atomic weight percentages wherein x is substantially equal to 81%, y is substantially equal to 11% and z is substantially equal to 8%. However, other percentages may be possible and yet provide a high amplitude sensor with desired magnetic stability.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming a spin valve sensor, comprising:

forming a pinned layer;

forming a spacer layer; and forming a free layer disposed on the spacer layer, the free layer comprising $Co_x$, $Fe_y$, and $Cu_z$, wherein x, y, and z represent the atomic weight percentages of Co, Fe, and Cu, respectively.

2. The method of claim 1 wherein the forming the free layer further comprises forming an alloy of $Co_x$, $Fe_y$, and $Cu_z$, wherein x is substantially equal to 81%, y is substantially equal to 11% and z is substantially equal to 8%.

3. The method of claim 1 wherein the forming of the pinned layer further comprises forming a ferromagnetic material.

4. The method of claim 1 wherein the forming of the pinned layer further comprises an antiferromagnetic coupled structure.

5. The method of claim 1 wherein the forming a free layer disposed on the spacer layer further comprises forming a free layer comprising an alloy of $Co_x$, $Fe_y$, and $Cu_z$, wherein x, y, and z represent the atomic weight percentages of Co, Fe, and Cu, respectively.

6. A thin film magnetoresistive (MR) spin valve read sensor comprising:

a pinned layer;

a spacer layer disposed on the pinned layer; and a free layer being disposed upon the spacer layer, the free layer comprising $Co_x$, $Fe_y$, and $Cu_z$, wherein x, y, and z represent the atomic weight percentages of Co, Fe, and Cu, respectively.

7. The sensor of claim 6 wherein the free layer further comprises an alloy of $Co_x$, $Fe_y$, and $Cu_z$, wherein x is substantially equal to 81%, y is substantially equal to 11% and z is substantially equal to 8%.

8. The sensor of claim 6 wherein the free layer comprises an alloy of $Co_x$, $Fe_y$, and $Cu_z$, wherein x, y, and z represent the atomic weight percentages of Co, Fe, and Cu, respectively.

9. The sensor of claim 6 wherein the pinned layer comprises ferromagnetic material.

10. The sensor of claim 6 wherein the pinned layer further comprises an antiferromagnetic coupled structure.

11. A magnetic storage system comprising:

at least one movable magnetic medium;

a slider;

an actuator for positioning the slider relative to the movable magnetic medium; and a head coupled to the slider such that the head may be positioned relative to the at least one movable magnetic medium by the action of moving the slider with the actuator;

wherein the head includes a GMR sensor having a pinned layer;

a spacer layer disposed on the pinned layer; and a free layer being disposed upon the spacer layer, the free layer comprising $Co_x$, $Fe_y$, and $Cu_z$, wherein x, y, and z represent the atomic weight percentages of Co, Fe, and Cu, respectively.

12. The magnetic storage system of claim 11 wherein the free layer further comprises an alloy of $Co_x$, $Fe_y$, and $Cu_z$, wherein x is substantially equal to 81%, y is substantially equal to 11% and z is substantially equal to 8%.

13. The magnetic storage system of claim 11 wherein the free layer comprises an alloy of $Co_x$, $Fe_y$, and $Cu_z$, wherein x, y, and z represent the atomic weight percentages of Co, Fe, and Cu, respectively.

14. The magnetic storage system of claim 11 wherein the pinned layer comprises a ferromagnetic material.

15. The magnetic storage system of claim 11 wherein the pinned layer further comprises an antiferromagnetic coupled structure.

16. The magnetic storage system of claim 11 wherein the free layer comprises moments perpendicular to moments of the pinned layer.

* * * * *